(12) United States Patent
Han et al.

(10) Patent No.: US 10,904,310 B2
(45) Date of Patent: Jan. 26, 2021

(54) METHOD AND APPARATUS FOR COMMUNICATING STREAMING DATA IN BLUETOOTH-BASED WIRELESS COMMUNICATION SYSTEM

(71) Applicant: Samsung Electronics Co., Ltd., Suwon-si (KR)

(72) Inventors: Eui-Bum Han, Seongnam-si (KR); Casper Bonde, Norager (DK); Kyu-Sang Ryu, Suwon-si (KR); Rasmus Abildgren, Skorping (DK); Hyung-Seoung Yoo, Anyang-si (KR); Allan Holst Eriksen, Randers (DK); Mee-Kyeong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 15/621,819

(22) Filed: Jun. 13, 2017

(65) Prior Publication Data

US 2017/0366596 A1 Dec. 21, 2017

(30) Foreign Application Priority Data

Jun. 17, 2016 (KR) ........................ 10-2016-0076065

(51) Int. Cl.
| | | |
|---|---|---|
| H04L 29/06 | (2006.01) | |
| H04L 1/00 | (2006.01) | |
| H04W 28/02 | (2009.01) | |
| H04L 12/835 | (2013.01) | |
| H04L 12/801 | (2013.01) | |

(Continued)

(52) U.S. Cl.
CPC ............ *H04L 65/80* (2013.01); *H04L 1/0002* (2013.01); *H04L 1/0006* (2013.01); *H04L 65/602* (2013.01); *H04W 28/0236* (2013.01); *H04L 1/1874* (2013.01); *H04L 1/20* (2013.01); *H04L 47/14* (2013.01); *H04L 47/30* (2013.01)

(58) Field of Classification Search
None
See application file for complete search history.

(56) References Cited

U.S. PATENT DOCUMENTS 7,496,077 B2 2/2009 Zhodzishsky et al.
8,577,291 B1 11/2013 Mak (Continued)

FOREIGN PATENT DOCUMENTS

| KR | 20040055553 A | 6/2004 |
| KR | 100454686 B1 | 11/2004 |
| KR | 101006394 B1 | 1/2011 |

*Primary Examiner* — Noel R Beharry
*Assistant Examiner* — Rodrick Mak (57) ABSTRACT

A method and apparatus for communicating streaming data in a Bluetooth-based wireless communication system is provided. An electronic device according to the present disclosure includes a communication interface configured to perform wireless Bluetooth communication with an external electronic device and a controller configured to control the communication interface, in which the controller is further configured to detect a communication state using a first packet data configuration and communicate with the external electronic device by using a second packet data configuration that is different from the first packet data configuration, based on the communication state.

16 Claims, 7 Drawing Sheets

(51) Int. Cl.
*H04L 1/20* (2006.01)
*H04L 1/18* (2006.01)

(56) References Cited

U.S. PATENT DOCUMENTS

| | | | |
|---|---|---|---|
| 2002/0194361 A1* | 12/2002 | Itoh | H04L 1/0002 709/233 |
| 2004/0076117 A1* | 4/2004 | Madapushi | H04L 47/10 370/230.1 |
| 2004/0120341 A1 | 6/2004 | Hur et al. | |
| 2005/0111485 A1* | 5/2005 | Bruckmann | H04L 1/0006 370/465 |
| 2006/0056332 A1* | 3/2006 | Arase | H04W 76/15 370/328 |
| 2008/0313520 A1* | 12/2008 | Suneya | H04L 1/0021 714/748 |
| 2011/0255437 A1* | 10/2011 | Hama | H04L 1/1835 370/252 |
| 2014/0201587 A1* | 7/2014 | Luby | H04L 1/0643 714/751 |
| 2015/0085655 A1* | 3/2015 | Jackson | H04L 47/25 370/232 |
| 2017/0064489 A1* | 3/2017 | Tanida | H04W 4/70 |

* cited by examiner

| Communication State Information | Packet Type | Compressed Frame Size(byte) | Number of Frames | Total Frame Size(byte) | Total Duration (ms) | Bitrate (kbps) |
|---|---|---|---|---|---|---|
| Good | 3-DH5 | 123 | 7 | 861 | 20.3 | 327 |
| Worse | 2-DH5 | 109 | 6 | 654 | 17.4 | 300 |
| Bad | 2-DH5 | 81 | 8 | 648 | 22.4 | 223 |
| Very Bad | 2-DH3 | 69 | 5 | 345 | 14.5 | 190 |

METHOD AND APPARATUS FOR COMMUNICATING STREAMING DATA IN BLUETOOTH-BASED WIRELESS COMMUNICATION SYSTEM

CROSS-REFERENCE TO RELATED APPLICATION(S) AND CLAIM OF PRIORITY

The present application is related to and claims the priority under 35 U.S.C. § 119(a) to Korean Application Serial No. 10-2016-0076065, which was filed in the Korean Intellectual Property Office on Jun. 17, 2016, the entire content of which is hereby incorporated by reference.

TECHNICAL FIELD

Various embodiments of the present disclosure relate to a method and apparatus for communicating streaming data in a Bluetooth-based wireless communication system.

BACKGROUND

Bluetooth is an industry standard for personal area networks (PAN). Bluetooth is a communication protocol designed to enable system configuration with low power consumption and at low cost using a frequency in a 2.4 GHz band that is an industrial, scientific and medical (ISM) band.

Bluetooth supports audio streaming technologies, and provides a function of transmitting audio packets for audio streaming to a counterpart device through a radio link. If the audio packet transmission fails due to various interfaces (e.g., Wireless Fidelity (WiFi), ZigBee, physical barriers, etc.) that may affect a Bluetooth band, retransmission of the failing audio packet is continuously attempted until the counterpart device sends an acknowledgement (ACK). In regard to a loss of the audio packet due to the retransmission, a predetermined amount of data may be buffered by a buffer of the counterpart device and the buffered data may be played back for a transmission failure during a short period, thus preventing sound discontinuation.

Compensation for the audio packet loss using the buffer in a conventional Bluetooth technology may solve the problem of the short-period transmission failure, but in case of continuous transmission failures due to continuous hindrances, i.e., various causes (e.g., a connection distance increase, radio frequency (RF) interference from an obstacle, etc.), a packet loss beyond a limit of the buffer causes a loss of a sound source, resulting in sound discontinuation. In addition, audio packet retransmission continuously occupies a time slot, exerting a negative influence on an RF environment of other RF devices (e.g., WiFi, Bluetooth low energy (BLE), ZigBee, etc.).

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is an object to provide a method and apparatus for communicating streaming data in a Bluetooth-based wireless communication system, by which a packet data configuration related to audio packet transmission is dynamically determined or changed based on various wireless interface environments or device environments that may affect a radio link environment of Bluetooth, thereby maintaining optimal audio streaming quality.

According to various embodiments of the present disclosure, there is provided an electronic device including a communication interface configured to perform wireless Bluetooth communication with an external electronic device and a controller configured to control the communication interface, in which the controller is further configured to detect a communication state using a first packet data configuration and communicate with the external electronic device by using a second packet data configuration that is different from the first packet data configuration, based on the communication state.

According to various embodiments of the present disclosure, there is provided a method for communicating packet data based on Bluetooth, the method including detecting a communication state using a first packet data configuration and communicating with an external electronic device by using a second packet data configuration that is different from the first packet data configuration, based on the communication state.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. In regard to the description of the drawings, like reference numerals refer to like elements. The singular forms are intended to include the plural forms as well, unless the context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. Examples of the wearable device may include at least one of an accessory type (e.g., a watch, a ring, a bracelet, an anklet, a necklace, glasses, contact lenses, head-mounted device (HIVID), etc.), a fabric or cloth-integrated type (e.g., electronic clothing, etc.), a body-attached type (e.g., a skin pad, a tattoo, etc.), a body implanted type (e.g., an implantable circuit, etc.), and so forth. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. The electronic device according to an embodiment of the present disclosure is not limited to the aforementioned devices. Herein, the term "user" used in various embodiments of the present disclosure may refer to a person who uses the electronic device or a device using the electronic device.

Figure 1:
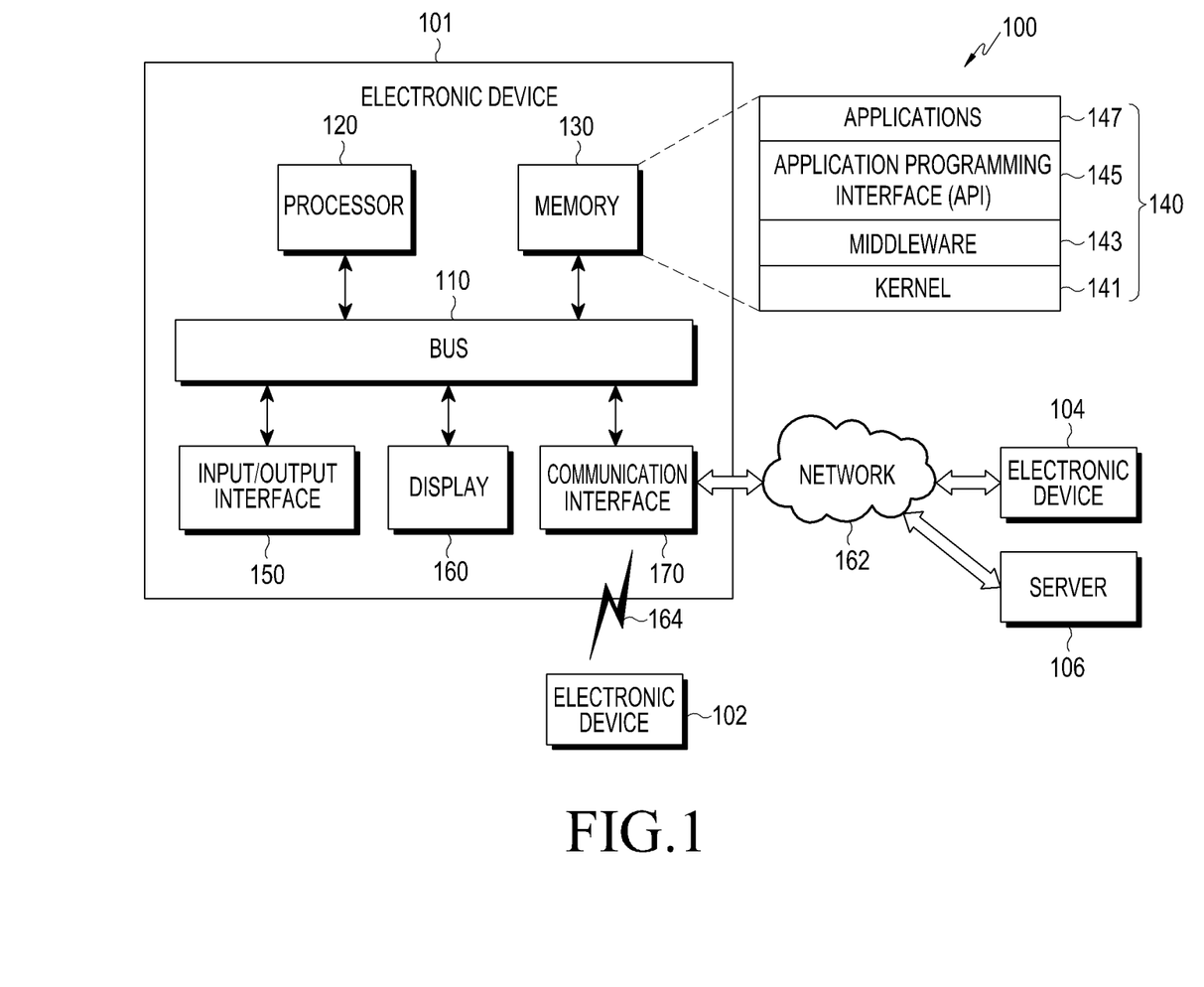
FIG. 1 illustrates an example electronic device in a network environment according to various embodiments of the present disclosure.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 170 and delivering communication (e.g., a control message or data) between the elements 110 to 170.

The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or a part of a body of a user. The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may include cellular communication using at least one of long term evolution (LTE), LTE-Advanced (LTE-A), code division multiple access (CDMA), wideband CDMA (WCDMA), a universal mobile telecommunication system (UMTS), wireless broadband (WiBro), or global system for mobile communications (GSM)). According to an embodiment, the wireless communication may include at least one of Wireless Fidelity (WiFi), Bluetooth, Bluetooth Low Energy (BLE), ZigBee, near field communication (NFC), magnetic secure transmission (MST), radio frequency (RF), and a body area network (BAN). According to an embodiment, the wireless communication may include GNSS. The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of universal serial bus (USB), high definition multimedia interface (HDMI), recommended standard 232 (RS-232), power line communication, and plain old telephone service (POTS). The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The other electronic device (e.g., the electronic device 102 or 104 or the server 106) may execute the requested function or additional function and deliver the execution result to the electronic device 101. The electronic device 101 may then process or further process the received result to provide the requested function or service. To this end, for example, cloud computing, distributed computing, or client-server computing may be used.

Figure 2:
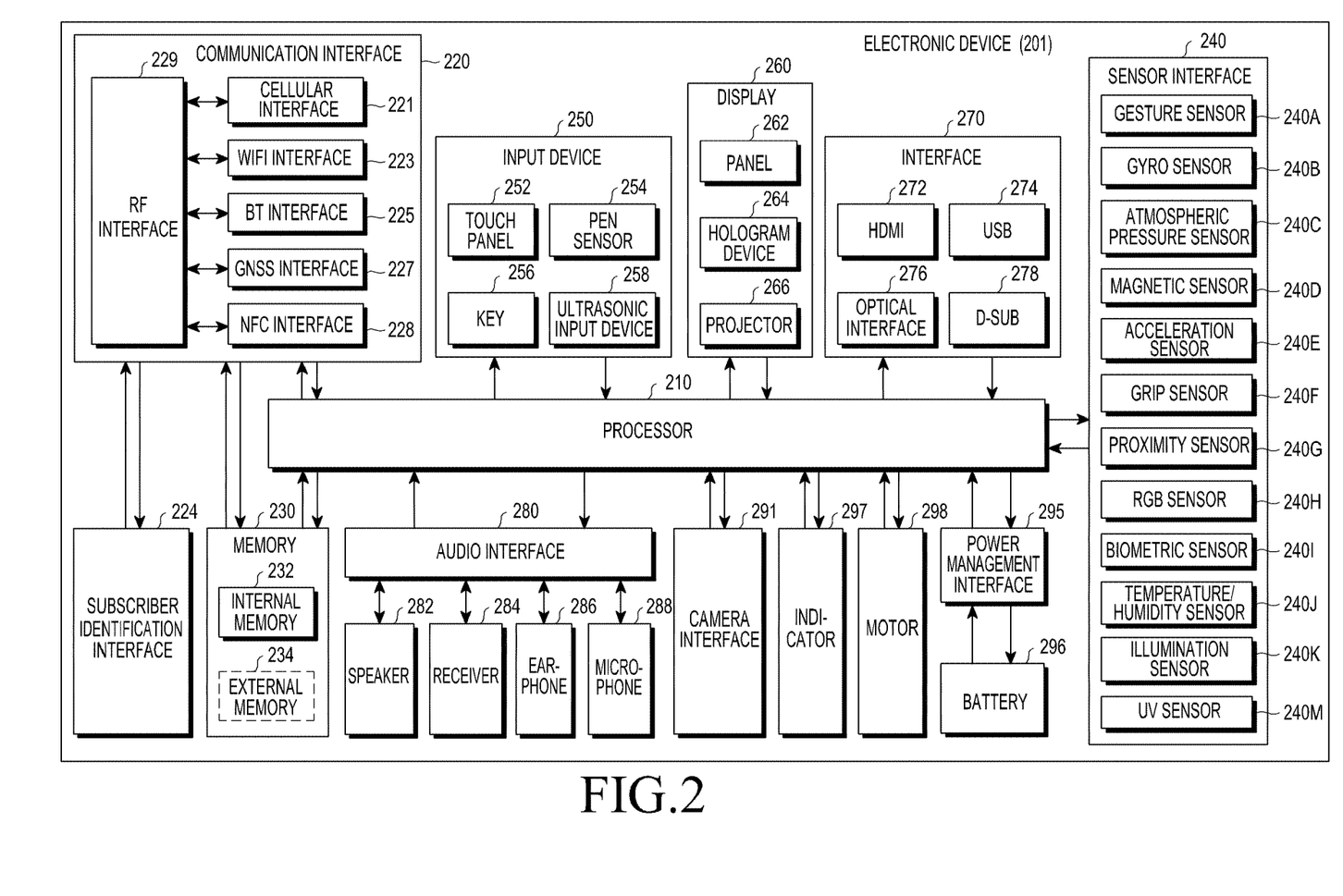
FIG. 2 illustrates another example electronic device according to various embodiments of the present disclosure.

FIG. 2 illustrates an example electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication interface 220, a subscriber identification module (SIM) 224, a memory 230, a sensor 240, an input device 250, a display 260, an interface 270, an audio 280, a camera 291, a power management 295, a battery 296, an indicator 297, and a motor 298. The processor 210 controls multiple hardware or software components connected to the processor 210 by driving an operating system (OS) or an application program, and performs processing and operations with respect to various data. The processor 210 may be implemented with, for example, a system on chip (SoC). According to an embodiment of the present disclosure, the server 210 may include a graphic processing unit (GPU) and/or an image signal processor. The processor 210 may include at least some of the elements illustrated in FIG. 2 (e.g., the cellular interface 221). The processor 210 loads an instruction or data received from at least one of other elements (e.g., a non-volatile memory) into a volatile memory to process the instruction or data, and stores result data in the non-volatile memory.

The communication interface 220 may have a configuration that is the same as or similar to the communication interface 170. The communication interface 220 may include, for example, the cellular interface 221, a WiFi interface 223, a Bluetooth (BT) module 225, a GNSS interface 227, a near field communication (NFC) module 228, and a radio frequency (RF) module 229. The cellular interface 221 may provide, for example, a voice call, a video call, a text service, or an Internet service over a communication network. According to an embodiment, the cellular interface 221 identifies and authenticates the electronic device 201 in a communication network by using the SIM 224 (e.g., a SIM card). According to an embodiment, the cellular interface 221 performs at least one of functions that may be provided by the processor 210. According to an embodiment, the cellular interface 221 may include a communication processor (CP). According to some embodiment, at least some (e.g., two or more) of the cellular interface 221, the WiFi interface 223, the BT interface 225, the GNSS interface 227, and the NFC interface 228 may be included in one integrated chip (IC) or IC package. The RF 229 may, for example, transmit and receive a communication signal (e.g., an RF signal). The RF 229 may include a transceiver, a power amp module (PAM), a frequency filter, a low noise amplifier (LNA), or an antenna. According to another embodiment, at least one of the cellular interface 221, the WiFi interface 223, the BT interface 225, the GNSS interface 227, and the NFC interface 228 may transmit and receive an RF signal through the separate RF. The SIM 224 may, for example, include a card including an SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor 240 measures physical quantity or senses an operation state of the electronic device 201 to convert the measured or sensed information into an electric signal. The sensor 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor 240 may further include a control circuit for controlling at least one sensor included therein. In some embodiment, the electronic device 201 may further include a processor configured to control the sensor 240 as part of or separately from the processor 210, to control the sensor 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. The hologram device 264 shows a stereoscopic image in the air by using interference of light. The projector 266 displays an image onto an external screen through projection of light. The screen may be positioned inside or outside the electronic device 201. According to an embodiment, the interface 270 may include a high-definition multimedia interface (HDMI) 272, a universal serial bus (USB) 274, an optical communication 276, or a D-subminiature 278. The interface 270 may be included in the communication interface 170 illustrated in FIG. 1. Additionally or alternatively, the interface 270 may include, for example, an MHL interface, an SD card/MMC interface, or an IrDA standard interface.

The audio 280 bi-directionally converts sound and an electric signal. At least one element of the audio 280 may be included in the input/output interface 145 illustrated in FIG. 1. The audio 280 processes sound information input or output through the speaker 282, the receiver 284, the earphone 286, or the microphone 288. The camera 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management 295 manages power of the electronic device 201. According to an embodiment, the power management 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 296 or the voltage, current, or temperature of the battery 296 during charging. The battery 296 may include a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
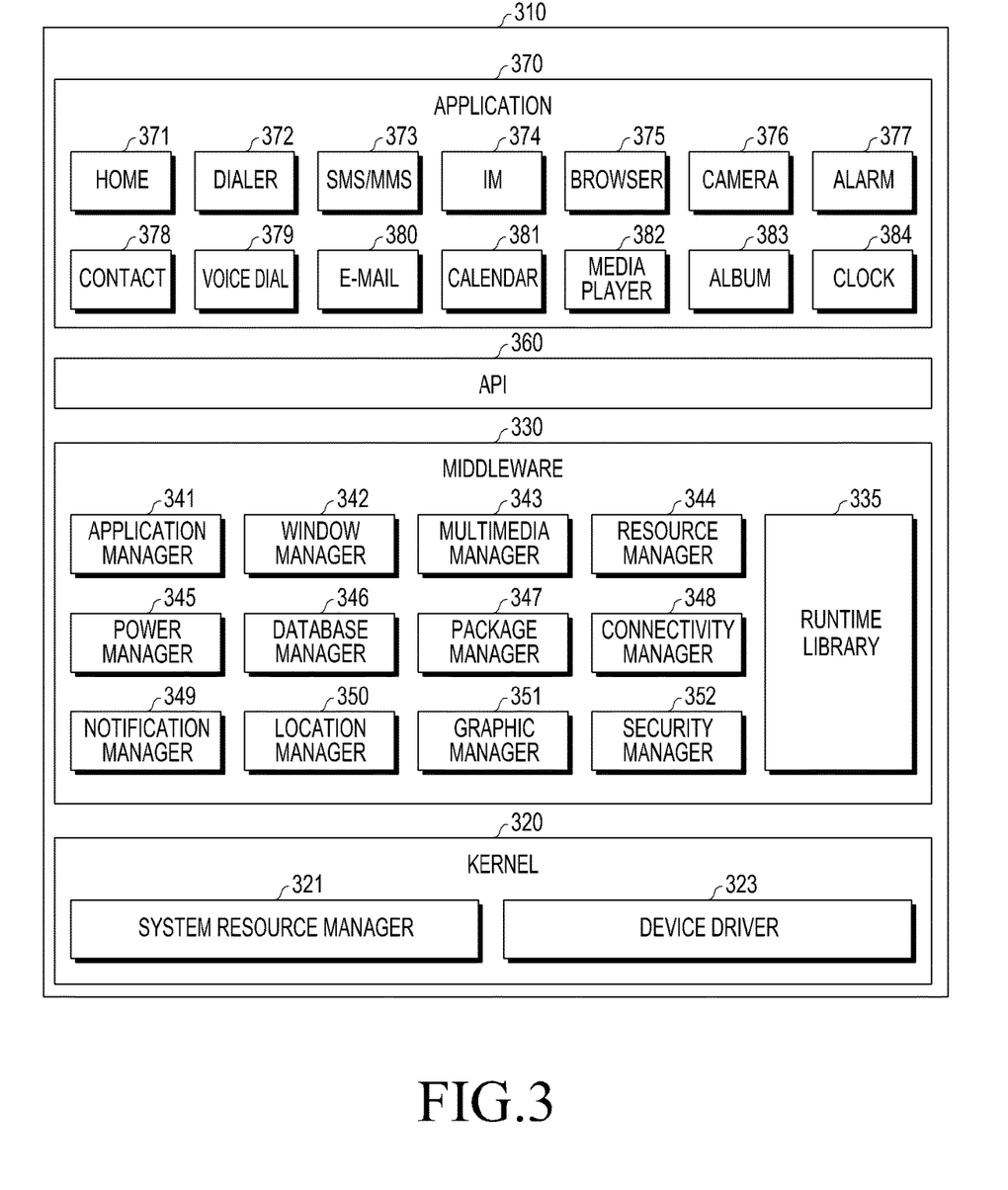
FIG. 3 illustrates an example programming module according to various embodiments of the present disclosure.

FIG. 3 illustrates an example programming module according to various embodiments of the present disclosure. According to an embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Bada™ Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the vehicle device 102, the electronic device 104, or the server 106).

The kernel 320 may include a system resource manager 321 and/or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370. The window manager 342 manages a GUI resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format.

The connectivity manager 348 manages a wireless connection. The notification manager 349 provides an event, e.g., an arriving message, an appointment, proximity notification, etc. The location manager 350 manages location information of an electronic device. The graphic manager 351 manages a graphic effect to be provided to a user or a user interface relating thereto. The security manager 352 provides system security or user authentication. According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner, or at least some of the operations may be executed in different orders, and may be omitted, or other operations may be added.

Figure 4:
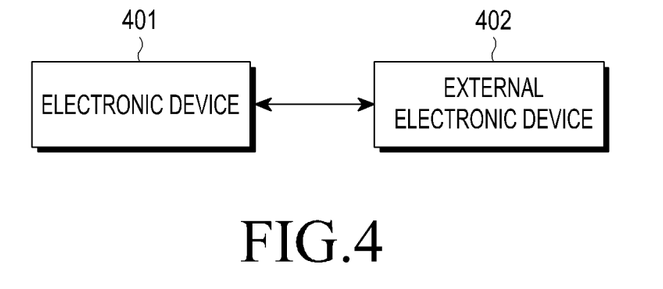
FIG. 4 illustrates an example electronic device and an external electronic device in a Bluetooth-based wireless communication system according to various embodiments of the present disclosure.
Figure 5:
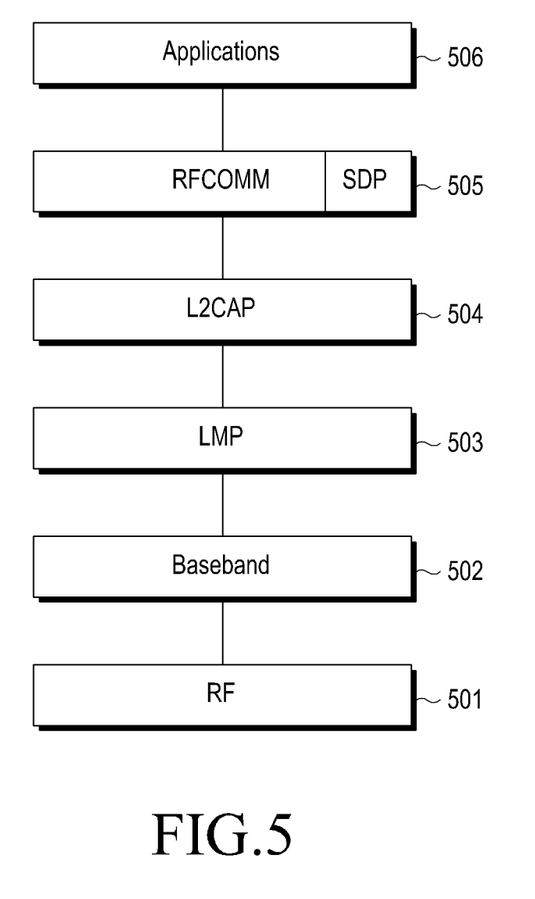
FIG. 5 illustrates an example protocol stack of Bluetooth according to various embodiments of the present disclosure.

FIG. 4 illustrates an example electronic device and an external electronic device in a Bluetooth-based wireless communication system according to various embodiments of the present disclosure, and FIG. 5 is a view for describing a protocol stack of Bluetooth according to various embodiments of the present disclosure.

Referring to FIG. 4, an electronic device 401 generates packet data having a compressed L2CAP header structure for transmission of audio packet data and transmits the generated packet data to an external electronic device 402. In Bluetooth, electronic devices may establish a link in a master-slave manner using a piconet scheme for communication. In the piconet scheme, one electronic device 401 (e.g., a master device) may configure a wireless network with multiple external electronic devices 402 (e.g., slave devices) to transmit and receive packet data therebetween.

To help the understanding of the present disclosure, a structure of a protocol stack of Bluetooth will be described first.

FIG. 5 illustrates the Bluetooth protocol stack, which is assumed to be a protocol stack included in the electronic device 401 (e.g., the master device), but a protocol stack included in the external electronic device 402 (e.g., the slave device) may be the same as the protocol stack illustrated in FIG. 5.

Referring to FIG. 5, an RF 501 actually controls a radio transceiver, and more specifically, performs frequency hopping over 79 channels 1600 times per second with a bandwidth of 1 MHz in an ISM band of 2.4 GHz-2.4835 GHz, modulates data using a Gaussian frequency shift keying (G-FSK) modulation scheme, and controls packet data and audio data, which are modulated into digital forms, to be transmitted and received using a time division duplex (TDD) scheme for duplex communication.

A baseband 502, which is a connection management protocol of a physical layer, is in charge of error recovery, logical channel management, frequency hopping algorithm, security, and so forth. There are connection types of the physical layer: an SCO link having no reliability and an ACL link guaranteeing reliability. A criterion of a link based on reliability may depend on data retransmission. A maximum of seven devices are connected through one piconet, and one of the seven devices is a master for performing piconet management, such as frequency hopping pattern generation, and so forth, and the other devices are slaves. Circuit and packet switching are supported, and each packet is transmitted at a different hopping frequency. Packet transmission is generally performed in one slot, but in some cases, may use three or five slots. Three voice channels may be synchronously transmitted at 64 kbps, and data may be asynchronously transmitted at 723 kbps/57.6 kbps or synchronously transmitted at 432.6 kbps.

A link manager protocol (LMP) 503, which is a protocol that manages link establishment between Bluetooth devices, provides a link control service such as automatic repeated request (ARQ) for requesting retransmission in case of reception of a baseband packet having an error or forward error correction (FEC) for tracking and modifying the number of bit errors of data.

Since a logical link control and adaptation protocol (L2CAP) 504 does not support identifiers for identifying higher layers or levels, the L2CAP 504 performs multiplexing to identify a higher layer such as a serial cable emulation protocol (RFCOMM), a service discovery protocol (SDP), etc., and segments a packet having a large size used in a higher layer into a size available in a baseband layer or reassembles packets used in multiple baseband layers into a size of a packet used in a higher layer. The L2CAP 504 is a protocol for implementing a quality of service (QoS) of data.

In an RFCOMM/SDP 505, RFCOMM is a protocol for emulating an RS-232 9-pin serial port based on TS 07.10 of the European Telecommunications Standards Institute (ETSI), and SDP is a protocol for exchanging information about a service available in a connected Bluetooth device and characteristics of the available service.

Applications 506 control Bluetooth applications. A Bluetooth application refers to an application to which a Bluetooth technique established in the Special Interest Group (SIG) is applied.

Various embodiments of the present disclosure propose a scheme for communicating streaming data in a Bluetooth-based wireless communication system.

Conventionally, a transmission failure is compensated for according to an ACL packet retransmission algorithm defined in Bluetooth specifications, and such a compensation algorithm merely detects a packet error based on a success or a failure in transmission of an ACL packet and on cyclic redundancy check (CRC) to perform retransmission of a packet including an error, without referring to information for guaranteeing a QoS, and thus is not suitable for audio streaming data transmission requiring real-time property.

The present disclosure proposes, for transmission of audio streaming data based on Bluetooth, an algorithm for detecting a communication state of audio packet data and optimally determining a packet transmission rate and the number of frames per packet based on the detected communication state, or an audio compressed frame size reflecting characteristics of various audio codecs, thereby optimizing the quality of sound provided by an audio streaming service. This is described below in greater detail.

Figure 6:
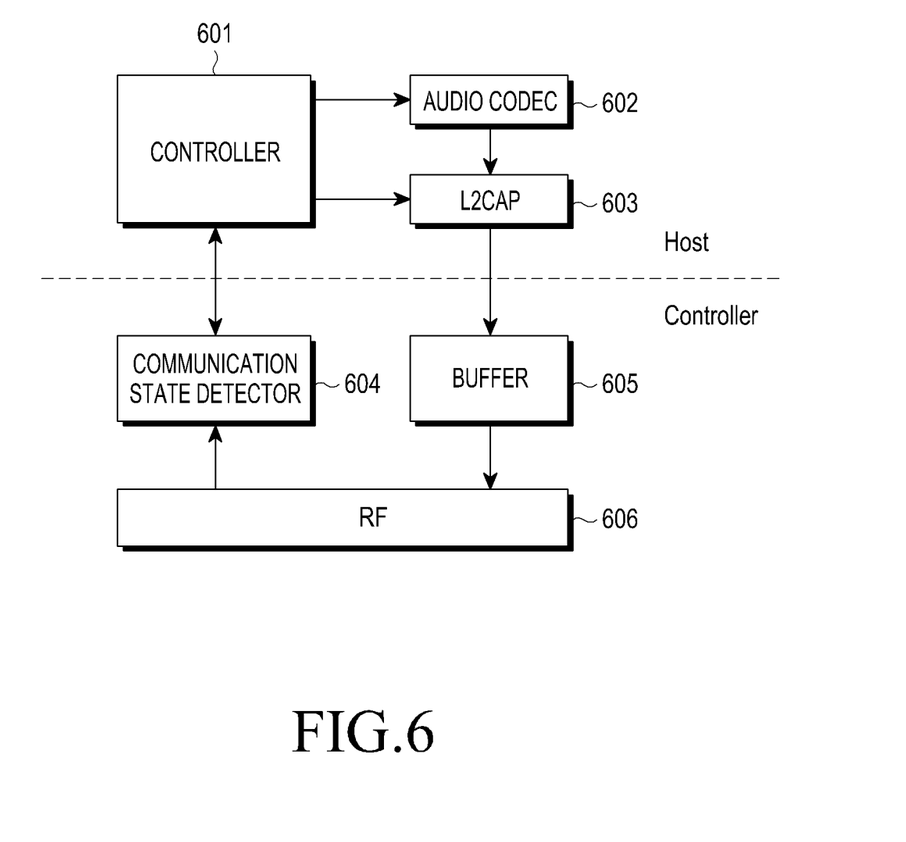
FIG. 6 illustrates an example an electronic device that communicates streaming data in a Bluetooth-based wireless communication system according to various embodiments of the present disclosure.

With reference to FIG. 6, a description will be made of an electronic device that communicates streaming data in a Bluetooth-based wireless communication system according to various embodiments of the present disclosure.

FIG. 6 illustrates an example electronic device that communicates streaming data in a Bluetooth-based wireless communication system according to various embodiments of the present disclosure. In FIG. 6, a communication state detector 604 for detecting a communication state of audio packet data and a controller 601 for controlling transmission of audio packet data based on the detected communication state are added to the Bluetooth stack structure of FIG. 5.

Referring to FIG. 6, an electronic device may be roughly divided into a host part that at least includes the controller 601, an audio codec 602, and an L2CAP 603 and a controller part that at least includes the communication state detector 604, a buffer 605, and an RF 606. The host part and the controller part exchange data through a host controller interface (HCI).

The controller 601 performs overall control over an operation of communicating packet data based on Bluetooth. The controller 601 controls an operation of configuring Bluetooth connection between an electronic device and an external electronic device. The controller 601 configures a first packet data configuration through negotiation for Bluetooth communication between the electronic device and the external electronic device. The first packet data configuration is a configuration for transmission of initial packet data between the electronic device and the external electronic device, and may include at least one of a packet transmission rate of packet data, the number of frames per packet, or an audio compressed frame size reflecting characteristics of a specific audio codec.

According to various embodiments, the controller 601, during transmission of packet data using the first packet data configuration, receives communication state information detected by the communication state detector 604, and determines a second packet data configuration that is different from the first packet data configuration, based on the received communication state information. The second packet data configuration is a configuration that changes at least one of a packet transmission rate of packet data, the number of frames per packet, or an audio compressed frame size reflecting characteristics of a specific audio codec differently than in the first packet data configuration to transmit the packet data in an optimal state, in case of change to a communication state that is different from a previous communication state. The second packet data configuration may be determined by selecting any one of a plurality of preset packet data configurations according to the communication state.

According to various embodiments, the controller 601 may determine a retransmission rate for packet data transmitted with the first packet data configuration using information received from the communication state detector 604 and detect the communication state based on the determined retransmission rate.

According to various embodiments, the controller 601 may determine a state of the buffer 605 of the electronic device or detect the communication state based on the determined state of the buffer 605, during transmission of packet data with the first packet data configuration using information received from the communication state detector 604.

According to various embodiments, the controller 601 may determine whether a request for stopping packet data transmission is received from the external electronic device and detect the communication state based on the determination of whether the request for stopping packet data transmission is received, during transmission of packet data with the first packet data configuration using information received from the communication state detector 604.

According to various embodiments, the controller 601 may determine state information regarding a channel in which packet data is transmitted with the first packet data configuration using information received from the communication state detector 604, and detect the communication state based on the determined state information.

According to various embodiments, the controller 601 may determine a packet transmission rate of transmittable packet data based on the communication state and determine the second packet data configuration according to the determined packet transmission rate. In this case, the controller 601 may determine the second packet data configuration based on whether the communication state continues for a predetermined time. For example, change of the communication state for a short time may be bypassed, and only when the communication state continues for a predetermined time, the second packet data configuration may be determined.

The audio codec 602 converts a pulse code modulation (PCM) signal of audio data into a digital audio signal, and compresses the digital audio signal to a predetermined frame size. The audio codec 602 may be included in the controller 601.

The L2CAP 603 supports higher-level protocol multiplexing, packet segmentation and reassembly, and conveying of QoS information. The L2CAP 603 causes a higher-level protocol and an application to transmit a higher-level data packet, i.e., an L2CAP service data unit (SDU), and performs channel flow-specific control through control over a flow and a retransmission mode. The L2CAP 603 provides physical channels referred to as L2CAP channels, each of which operates in a basic L2CAP mode, a flow control mode, and a retransmission mode. According to various embodiments, the L2CAP 603 may control a data flow with respect to audio data output from the audio codec 602 for asynchronous communication with an external electronic device through buffering.

The communication state detector 604 detects a communication state of the packet data while transmitting the packet data to the external electronic device through the RF 606. The communication state detector 604 may detect the communication state based on a retransmission rate of the packet data, during the transmission of the packet data. The communication state detector 604 may detect the communication state based on a state of the buffer 605 in which the packet data temporarily waits, during the transmission of the packet data. For example, the communication state detector

604 may detect the communication state by using the state of the buffer 605, i.e., based on whether there is waiting packet data in the buffer 605 or the amount of data in the buffer 605. The communication state detector 604 may detect the communication state based on whether a request for stopping packet data transmission is received from the external electronic device, during the transmission of the packet data. For example, if there is a large amount of data temporarily stored in a buffer of the external electronic device, the external electronic device may send a request for temporarily stopping packet data transmission, and the communication state detector 604 may detect the communication state based on whether the request for stopping packet data transmission is received from the external electronic device. The communication state detector 604 may detect the communication state based on state information regarding a channel in which the packet data is transmitted, during the transmission of the packet data.

The buffer 605 performs buffering to make data to be transmitted to the external electronic device wait temporarily, thus enabling asynchronous communication.

The RF 606 performs a wireless communication function of the electronic device. The RF 606 transmits packet data to the external electronic device based on Bluetooth. The RF 606 receives packet data from the external electronic device based on Bluetooth. The RF 606 may perform various types of wired/wireless communication as well as a Bluetooth-based communication function. According to various embodiments, the RF 606 may collect state information regarding a channel in which the packet data is transmitted, and provide the collected state information to the communication state detector 604.

Figure 7:
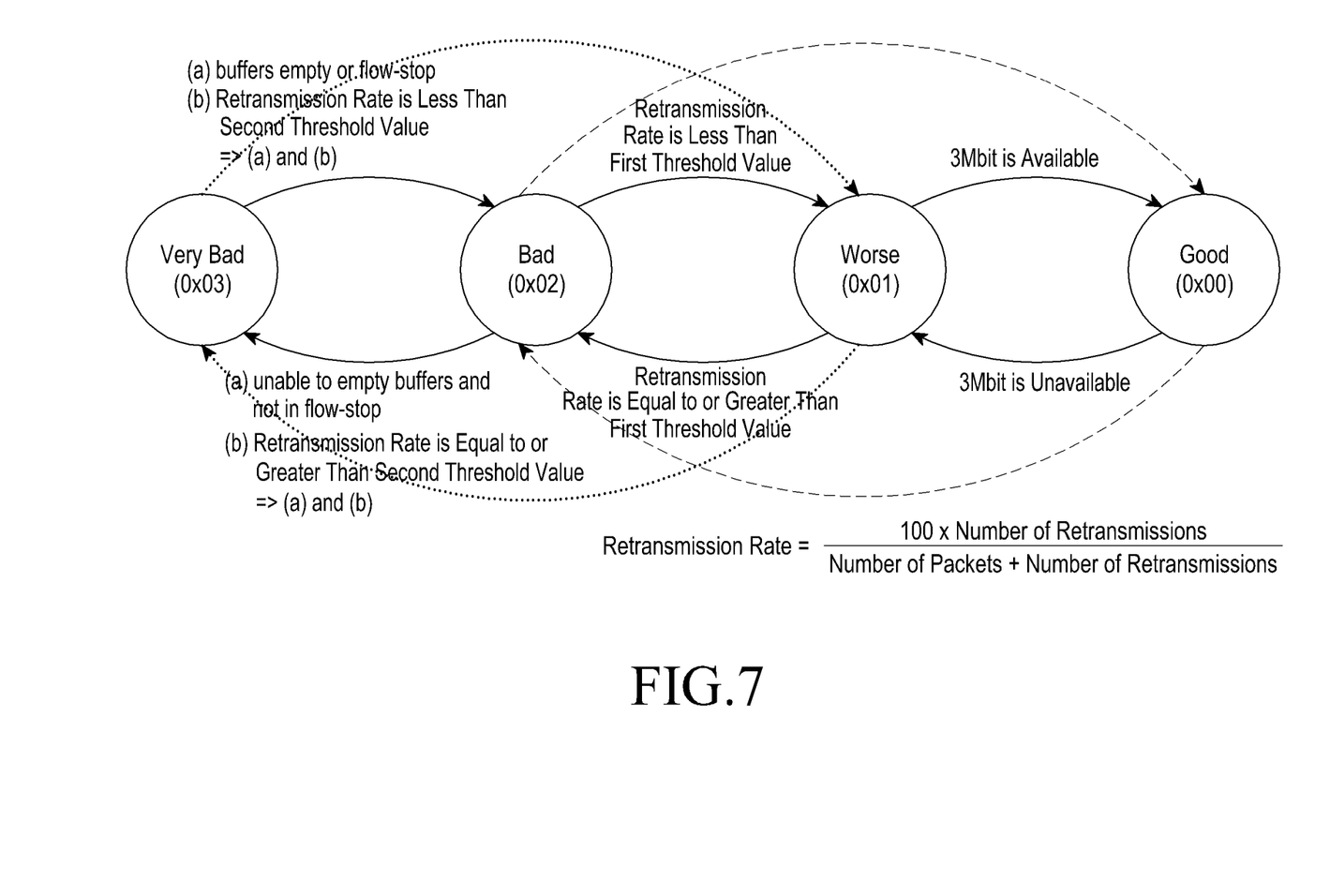
FIG. 7 illustrates an example method for determining a packet data configuration based on a communication state for a packet data transmission according to various embodiments of the present disclosure.
Figure 8:
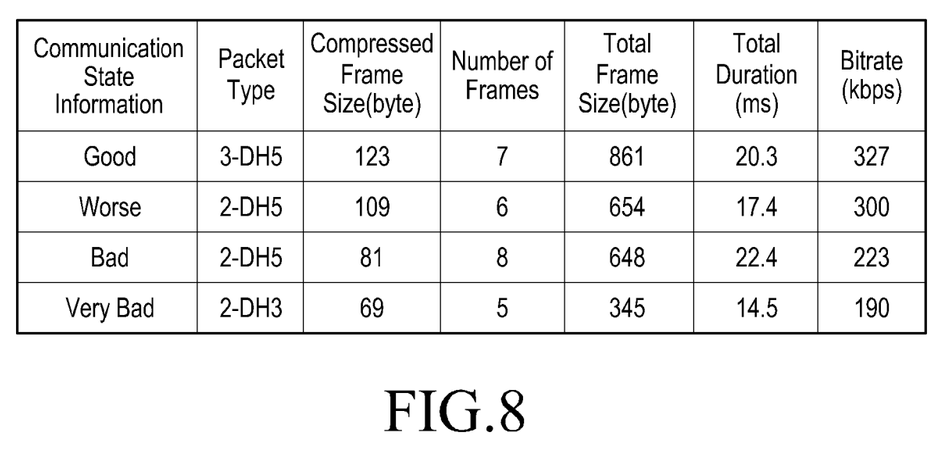
FIG. 8 illustrates another example method for determining a packet data configuration based on a communication state for a packet data transmission according to various embodiments of the present disclosure.

FIG. 7 illustrates an example method for determining a packet data configuration based on a communication state for packet data transmission according to various embodiments of the present disclosure, and FIG. 8 illustrates another example method for determining a packet data configuration based on a communication state for packet data transmission according to various embodiments of the present disclosure.

Referring to FIG. 7, a communication state for transmitting packet data according to various embodiments of the present disclosure is determined based on, as negotiation information exchanged between the electronic device and the external electronic device, combined information of at least one or two of a channel quality driven data rate (CQDDR) value, a retransmission rate for packet data, a buffer state of the electronic device, and a buffer state of the external electronic device or a request from the external electronic device for stopping packet data transmission based on the buffer state. At least two communication states may be defined, and for example, as shown in FIG. 7, there may be four types of communication states: Good, Worse, Bad, and Very Bad.

The communication state of the type 'Good' is a state where a wireless interface environment is very good and packet data may be communicated with a packet data type of 3-DH5. The communication state of the type 'Good' may be determined based on the CQDDR value received by the electronic device from the external electronic device. The CQDDR value, which is comprehensive channel information including adaptive frequency hopping (AFH), a received signal strength indicator (RSSI), a master/a slave, the number of connections, a coex state, and a WiFi operation state in a Bluetooth communication environment, may be used by the electronic device to determine a desired packet data type in the external electronic device. That is, the communication state of the type 'Good' may be determined based on the CQDDR value according to whether the external electronic device having received the packet data may support the packet data type of 3-DH5. If the communication state of the type is determined based on the CQDDR value that the external electronic device does not support 3-DH5, the communication state may be changed to the type 'Worse'. According to various embodiments, the communication state of the type 'Good' may be determined based on a retransmission rate of packet data together with the CQDDR value or based on the retransmission rate of packet data in place of the CQDDR value.

The communication state of the type 'Worse' is a state where the wireless interface environment is good and packet data may be communicated with a packet data type of 2-DH5. The communication state of the type 'Worse' may be changed in association with the communication state of the type 'Bad'. The communication state of the 'Worse' and the communication state of the type 'Bad' may be determined based on a retransmission rate of packet data. For example, if a retransmission rate of packet data is less than a preset first threshold value, the communication state may be determined to be the type 'Worse'; if the retransmission rate is greater than or equal to the first threshold value, the communication state may be determined to be the type 'Bad'. The first threshold value is preset to distinguish the type 'Bad' from the type 'Worse' for the retransmission rate.

The communication state of the type 'Bad' is a state where the wireless interface environment is bad and packet data may be communicated with a packet data type of 2-DH5 that is identical to the communication state 'Worse'. In the communication state of the type 'Bad', a transmission interval may be longer than in the communication state of the type 'Worse', or in some periods, data transmission may be skipped to maintain a lower bitrate. The communication state of the type 'Bad' and the communication state of the type 'Very Bad' may be determined based on a retransmission rate of packet data. For example, if a retransmission rate of packet data is less than a preset second threshold value that is different from the first threshold value, the communication state may be determined to be the type 'Bad', if the retransmission rate is greater than or equal to the second threshold value, the communication state may be determined to be the type 'Very Bad'. The first threshold value may be equal to or greater than the second threshold value. The communication state of the type 'Bad' and the communication state of the type 'Very Bad' may be determined based on a buffer state of an electronic device and a buffer state of an external electronic device or a request for stopping packet data transmission based on the buffer state. For example, if the buffer state of the electronic device is 'empty' or the request for stopping packet data transmission is received from the external electronic device, it may be determined that communication of packet data is being performed between the electronic device and the external electronic device, and thus the communication state may be determined to be the type 'Bad'. If the buffer state of the electronic device is not 'empty' and the request for stopping packet data transmission is not received from the external electronic device, it may be determined that communication of packet data is not smoothly performed between the electronic device and the external electronic device, and thus the communication state may be determined to be the type 'Very Bad'. The communication state of the type 'Bad' and the communication state of the type 'Very Bad' may be determined based on both a retransmission rate of packet data and a buffer state.

Referring to FIG. 8, the method for determining a packet data configuration according to various embodiments of the present disclosure may determine or change at least one of a packet transmission rate of packet data, the number of frames per packet, and an audio compressed frame size reflecting characteristics of a specific audio codec, depending on a communication state for transmitting the packet data. The packet data configuration may be determined by selecting any one of a plurality of preset packet data configurations according to the communication state. For example, as shown in FIG. 8, a packet data configuration may be set in advance differently according to the four types of the communication states and may be stored as a table. In FIG. 8, when an audio codec is an SBC codec, a communication data configuration is set for each communication state.

For example, in the type 'Good', the packet data type may be set to 3-DH5, the compressed frame size may be set 123, and the number of frames per packet may be set to 7. In the type 'Worse', the packet data type may be set to 2-DH5, the compressed frame size may be set 109, and the number of frames per packet may be set to 6. In the type 'Bad', the packet data type may be set to 2-DH5 that is the same as in the type 'Worse', and for difference than the type 'Worse', the compressed frame size may be set to 81 and the number of frames per packet may be set to 8. In this case, between the type 'Worse' and the type 'Bad', there are differences in a transmission interval and a bit rate, and packet data may be communicated optimally for a corresponding communication state.

Figure 9:
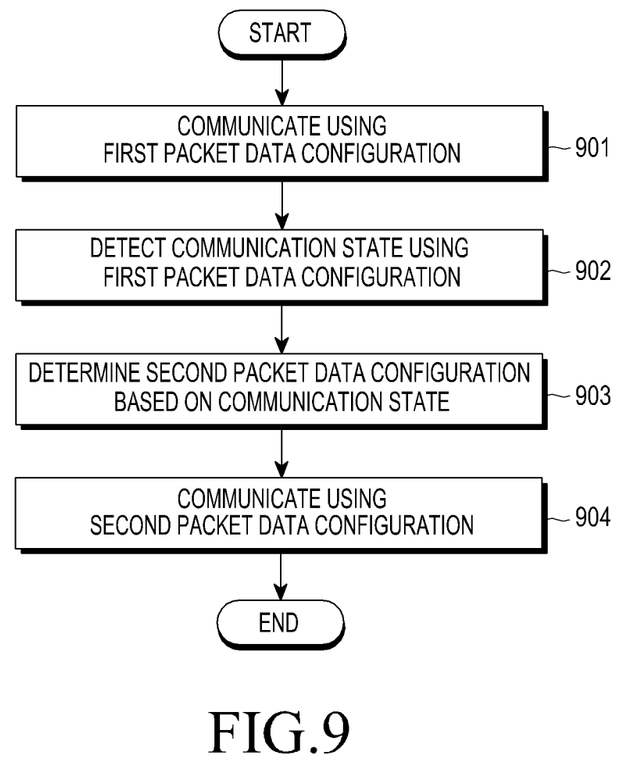
FIG. 9 illustrates yet another example method for communicating packet data in a Bluetooth-based wireless communication system according to various embodiments of the present disclosure.

FIG. 9 illustrates yet another example method for communicating packet data in a Bluetooth-based wireless communication system according to various embodiments of the present disclosure.

With reference to FIG. 9, a description will be made of a method for communicating packet data in a Bluetooth-based wireless communication system according to various embodiments of the present disclosure.

In operation 901, an electronic device communicates packet data with an external electronic device using a first packet data configuration. The first packet data configuration may be set through negotiation for Bluetooth communication between the electronic device and the external electronic device. The first packet data configuration is a configuration for transmission of initial packet data between the electronic device and the external electronic device, and may include at least one of a packet transmission rate of packet data, the number of frames per packet, or an audio compressed frame size reflecting characteristics of a specific audio codec.

In operation 902, the electronic device detects a communication state using the first packet data configuration. The electronic device may detect the communication state based on a retransmission rate of the packet data transmitted using the first packet data configuration. The electronic device may detect the communication state based on the buffer state of the electronic device during the transmission of the packet data using the first packet data configuration. The electronic device may detect the communication state based on whether a request for stopping packet data transmission is received from the external electronic device, during the transmission of the packet data using the first packet data configuration. The electronic device may detect the communication state based on state information regarding a channel in which the packet data is transmitted using the first packet data configuration.

In operation 903, the electronic device determines a second packet data configuration based on the communication state. The second packet data configuration may be set differently than the first packet data configuration. The second packet data configuration is a configuration that changes at least one of a packet transmission rate of packet data, the number of frames per packet, or an audio compressed frame size reflecting characteristics of a specific audio codec differently than in the first packet data configuration to transmit the packet data in an optimal state, in case of change to a communication state that is different from a previous communication state. The second packet data configuration may be determined by selecting any one of a plurality of preset packet data configurations according to the communication state.

In operation 904, the electronic device communicates the packet data with the external electronic device using a second packet data configuration.

According to various embodiments of the present disclosure, by providing a method and apparatus for communicating streaming data in a Bluetooth-based wireless communication system, a packet data configuration related to audio packet transmission may be dynamically determined or changed based on various wireless interface environments or device environments that may affect a radio link environment of Bluetooth. In this way, an optimal audio streaming quality may be maintained in a given radio link environment.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
 a communication interface configured to perform a short-range wireless communication with an external electronic device; and
 at least one processor electrically connected with the communication interface and configured to:
 identify a type of a communication state based on a state of a buffer in which packet data temporarily waits in the electronic device and a retransmission rate of packet data transmitted using a first packet data configuration,
 identify a second packet data configuration corresponding to the identified type of the communication state, wherein the second packet data configuration is one of a plurality of packet data configurations different from the first packet data configuration, and
 control the communication interface to communicate with the external electronic device using the second packet data configuration based on the communication state,
 wherein the at least one processor is, when identifying the type of the communication state, further configured to:
 identify a first type indicating a good state of an air interface environment as the type of the communication state based on channel information received from the external electronic device;
 identify a second type of the air interface environment as the type of the communication state based on the retransmission rate being less than a first threshold;
 identify a third type of the air interface environment as the type of the communication state based on the retransmission rate being equal to or greater than the first threshold and less than a second threshold that is greater than the first threshold; and identify a fourth type of the air interface environment as the type of the communication state based on at least one of the retransmission rate being equal to or greater than the second threshold.

2. The electronic device of claim 1, wherein the first packet data configuration and the second packet data configuration comprise at least one of a packet transmission rate, a number of frames per packet, or a compressed frame size.

3. The electronic device of claim 1, wherein the at least one processor is further configured to, during a transmission of packet data using the first packet data configuration, detect the communication state based on whether a request for stopping the transmission of the packet data is received from the external electronic device.

4. The electronic device of claim 1, wherein the at least one processor is further configured to, during a transmission of packet data using the first packet data configuration, detect the communication state based on the state of the buffer in which packet data temporarily waits in the electronic device and on whether a request for stopping the transmission of the packet data is received from the external electronic device.

5. The electronic device of claim 1, wherein the at least one processor is further configured to detect the communication state based on channel information associated with a channel in which packet data is transmitted using the first packet data configuration.

6. The electronic device of claim 1, wherein the at least one processor is further configured to:
   determine a packet transmission rate of transmittable packet data based on the communication state; and
   determine the second packet data configuration based on the determined packet transmission rate.

7. The electronic device of claim 1, wherein the at least one processor is further configured to determine the second packet data configuration based on whether the communication state continues for a predetermined time.

8. The electronic device of claim 1, further comprising a communication state detector configured to detect a communication state of communication of packet data performed by the communication interface,
   wherein the at least one processor is further configured to:
      receive communication state information detected by the communication interface during a transmission of packet data using the first packet data configuration; and
      detect the communication state based on the received communication state information.

9. A method of an electronic device for communicating packet data in a short-range wireless communication, the method comprising:
   identifying a type of a communication state based on a state of a buffer in which packet data temporarily waits in the electronic device and a retransmission rate of packet data transmitted using a first packet data configuration;
   identifying a second packet data configuration corresponding to the identified type of the communication state, wherein the second packet data configuration is one of a plurality of packet data configurations different from the first packet data configuration, and
   controlling a communication interface to communicating with an external electronic device using the second packet data configuration based on the communication state,
   wherein identifying the type of the communication state comprises:
      identifying a first type indicating a good state of an air interface environment, as the type of the communication state based on channel information received from the external electronic device;
      identifying a second type of the air interface environment as the type of the communication state based on the retransmission rate being less than a first threshold;
      identifying a third type of the air interface environment as the type of the communication state based on the retransmission rate being equal to or greater than the first threshold and less than a second threshold that is greater than the first threshold; and
      identifying a fourth type of the air interface environment as the type of the communication state based on at least one of the retransmission rate being equal to or greater than the second threshold.

10. The method of claim 9, wherein the first packet data configuration and the second packet data configuration comprise at least one of a packet transmission rate, a number of frames per packet, or a compressed frame size.

11. The method of claim 9, further comprising:
   during a transmission of the packet data using the first packet data configuration, detecting the communication state based on whether a request for stopping the transmission of the packet data is received from the external electronic device.

12. The method of claim 9, further comprising:
   during a transmission of packet data using the first packet data configuration, detecting the communication state based on the state of the buffer in which packet data temporarily waits in the electronic device and on whether a request for stopping transmission of the packet data is received from the external electronic device.

13. The method of claim 9, further comprising:
   detecting the communication state based on channel information associated with a channel in which packet data is transmitted using the first packet data configuration.

14. The method of claim 9, further comprising:
   determining a packet transmission rate of transmittable packet data based on the communication state; and
   determining the second packet data configuration based on the determined packet transmission rate.

15. The method of claim 9, further comprising:
   determining the second packet data configuration based on whether the communication state continues for a predetermined time.

16. The method of claim 9, further comprising:
   receiving communication state information during a transmission of the packet data using the first packet data configuration; and
   detecting the communication state based on the received communication state information.

* * * * *